CRYSTAL DISCRIMINATOR

Filed Nov. 21, 1960

WOLFGANG G. PRENOSIL
INVENTORS
ROBERT G. KINSMAN
BY Lyon & Lyon
ATTORNEYS

United States Patent Office 3,155,913
Patented Nov. 3, 1964

3,155,913
CRYSTAL DISCRIMINATOR
Wolfgang G. Prenosil and Robert G. Kinsman, Torrance, Calif., assignors, by mesne assignments, to Pacific Industries, Inc., a corporation of California
Filed Nov. 21, 1960, Ser. No. 70,491
4 Claims. (Cl. 329—117)

This invention relates to improved means and techniques for detecting frequency variations in an electrical signal, the signal having its frequency changed to impart modulation to the signal and in such case the system disclosed herein may be termed a frequency discriminator.

In accordance with an important aspect of the present invention the system uses two crystals in one arm of a network connected either in series or in parallel to obtain the advantages of the frequency stability of a crystal and at the same time to render unnecessary the use of critical passive non-crystal elements in achieving the advantage of the crystal.

A discriminator network which makes use of piezoelectric crystals as frequency-sensitive impedance elements is superior to the more conventional type discriminator networks where lumped capacitances, inductances and/or a single crystal or combinations thereof are employed exclusively to provide a frequency-sensitive impedance. For example, where it is required that the center frequency at which the discriminator is designed to operate be maintained within very close tolerance limits, the inherent frequency stability of crystals with temperature and time is especially advantageous. Then, too, by virtue of the rapid change in reactance exhibited by crystals as a function of frequency, the sensitivity of a discriminator incorporating crystals in the manner described herein is appreciably high as is especially desirable in the detection of signals which undergo frequency changes in a relatively narrow band of frequencies.

While the frequency stability of the crystal has been well understood by those skilled in the art and has been incorporated in discriminators, such prior art discriminators in most instances have used a combination of a crystal and a reactive element to create a frequency-sensitive impedance over the frequency range of interest. Thus, although one limit of the frequency band was well defined by the crystal, the other limit of the band was defined by the combination of a crystal and a capacitor in those instances where the band width of interest is relatively narrow; and in those instances where the band widths were of greater extent, the prior art used the combination of a crystal and an inductance.

An important object of the present invention is to provide a sensitive frequency discriminator network which uses a combination of crystals resonant at different frequencies that establish the limits of the frequency band of interest, thereby, by proper selection of resonant frequency of the crystals, to accomplish maximum sensitivity and linearity.

Another object of the present invention is to provide a frequency-sensitive impedance comprised solely of piezoelectric crystals, thereby rendering the stability and life of the impedance independent of reactive components.

Another object of the present invention is to provide an improved frequency-detection network having its stability, both with respect to time and temperature, established exclusively by the crystals.

Another object of the present invention is to provide a frequency-sensitive impedance having its characteristics determined exclusively by two crystals and which does not require exact adjustment of associated reactances in order to obtain the desired bandwidth and linearity characteristics.

Another object of the present invention is to provide a frequency-sensitive impedance comprising two crystals in which the linearity of the frequency response is not dictated by critical tuning of reactive elements in the source of signals connected thereto.

Another object of the present invention is to provide an improved frequency discriminator network which has a relatively large frequency range for detecting the modulation components on a linear scale.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
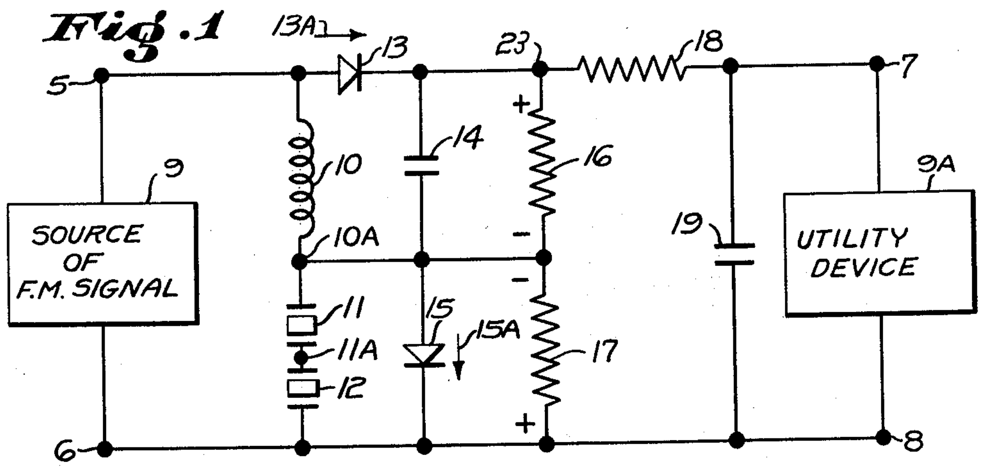
FIGURE 1 illustrates generally a frequency-detecting arrangement embodying features of the present invention.

Referring to the drawings, the frequency discriminator network embodying important features of the present invention has a pair of input terminals 5 and 6 and a pair of output terminals 7 and 8, the input terminals 5 and 6 being connected to a source of frequency-modulated signals 9 and the output terminals 7 and 8 being connected to a network represented generally as a utility device 9A. It will be appreciated that the source 9 may be any source of frequency-modulated signals and may, for example, be derived from the intermediate frequency output stage of a superheterodyne receiver; and the means referred to broadly as 9A may be the input circuit of the audio amplifier stage of the same receiver.

Connected across the input terminals 5, 6 is a voltage-dividing circuit comprising an inductance 10 and a combination of two series-connected piezoelectric crystals 11 and 12, these series-connected crystals 11 and 12 being connected to the inductance 10 at the junction point 10A. This inductance or inductor 10 has a relatively constant impedance over the operating band of frequencies, whereas each of the crystals 11 and 12 has a reactance which changes relatively sharp in the range of frequencies corresponding to the frequency band of interest. Consequently, the amount of voltage developed across the inductor 10 remains relatively constant as compared with the voltage developed across either crystal 11 or crystal 12 which are interconnected at the junction point 11A. In other words, the voltage developed across the terminals 5, 10A remains relatively constant over the frequency band of interest, whereas the voltage which is developed across terminals 10A and 6 changes radically.

Figure 4:
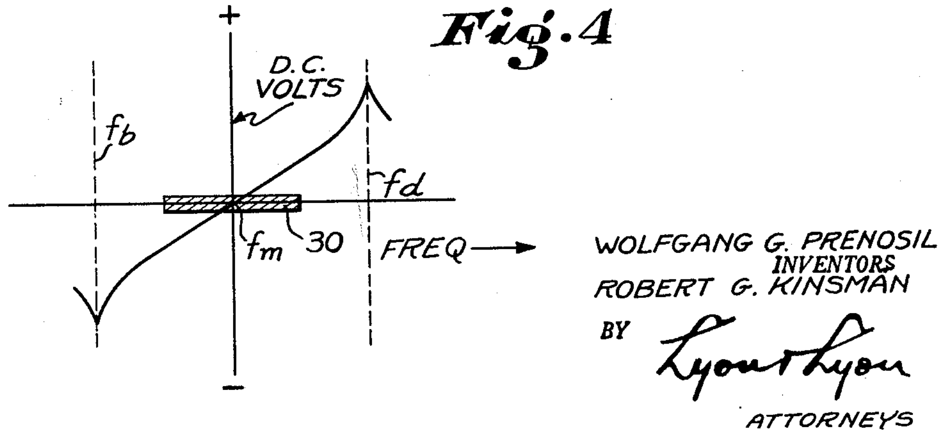
FIGURE 4 is a graph in which output voltage appears as ordinates and frequency appears as abscissae and is useful in explaining the operation of the system shown in FIGURE 1.

To convert this voltage relationship into a usable output signal, a balanced rectifier circuit is provided, the same being adapted to furnish a direct output voltage across terminals 7 and 8, as indicated in FIGURE 4, representative of the difference in magnitude of the voltage across inductor 10 on the one hand and the voltage across the two series-connected crystals 11 and 12 on the other hand.

As exemplified in FIGURE 1, the balanced rectifier circuit comprises a rectifying element or diode 13 having one of its terminals connected to the terminal 5 and the other one of its terminals connected to interconnected terminals of capacitor 14 and resistance 16, the other terminals of these shunt-connected elements 14, 16 being connected at junction point 10A to interconnected terminals of the shunt-connected diode 15 and resistance 17, the other terminals of elements 15 and 17 being connected to the terminal 6. As will be explained later, the required difference voltage appears across the resistances 16 and 17. For this purpose the rectifying or diode elements 13, 15 have the relative polarities as indicated, namely that they are unidirectional conducting and conduct in the directions indicated by the arrows 13A and 15A. Completing the network is a resistance 18 having one of its terminals connected at the junction point of elements 13, 14 and 16 and the other one of its terminals connected to the output terminal 7; and a capacitor 19 is connected across the output terminals 7 and 8. Preferably the resistances 16 and 17 have equal values. The resistor 18 serves for regulation or isolation purposes and has a value such that the output voltage follows closely the frequency deviation of the input voltage.

Figure 2:
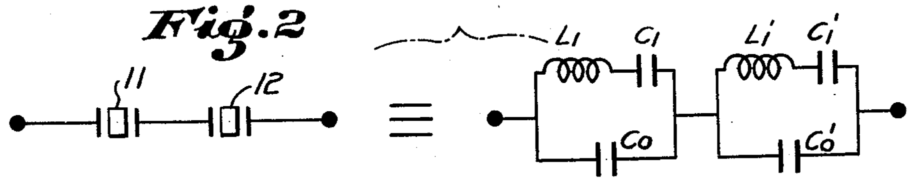
FIGURE 2 illustrates the electrical equivalents of the two series-connected crystals in FIGURE 1.

FIGURE 2 illustrates the equivalent circuits for the piezoelectric crystals 11 and 12 and it will be observed that the equivalent circuit for each crystal comprises an inductor connected in series with a capacitor and a shunt capacitor paralleling the series combination of the inductor and capacitor. Thus, the equivalent circuit for crystal 11 is represented by the inductance $L_1$, $C_1$ and $C_0$ and the equivalent circuit for the crystal 12 is $L_1'$, $C_1'$ and condenser $C_0'$.

Figure 3:
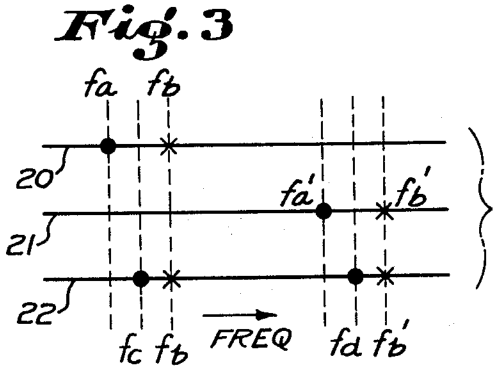
FIGURE 3 is a diagram illustrating the resonant and anti-resonant frequencies (zero-pole spacing) of each of the two individual crystals and the resonant and anti-resonant frequencies which are established by the series connection of the two crystals in FIGURE 1.

FIGURE 3 represents three conditions on the three lines 20, 21 and 22. The line 20 has reference to the crystal 11, the line 21 has reference to the higher frequency crystal 12 and the line 22 illustrates joint action of the two series-connected crystals in FIGURE 2. On line 20 there is plotted the frequency $f_a$ and $f_b$ referred to respectively as a zero and a pole, the resonant and anti-resonant frequencies of crystal 11; on line 21 there is illustrated the frequencies $f_a'$ and $f_b'$, the resonant and anti-resonant frequencies of crystal 12, also referred to as zero $f_a'$ and pole $f_b'$; and on line 22 the dots represent the new zero $f_c$ and the new zero $f_d$ obtained by the joint action of the two crystals 11 and 12. In this series combination the two poles $f_b$ and $f_b'$ are substantially the same as those in the corresponding individual crystals. However, two new zeros $f_c$ and $f_d$ are generated. One zero $f_c$ is located between the zero $f_a$ and pole $f_b$ of the lower frequency crystal and the other zero $f_d$ is located between the zero $f_a'$ and pole $f_b'$ of the higher frequency crystal. The region of interest is in the frequency range between the pole $f_b$ and zero $f_d$ resulting from the series connection of the two crystals.

FIGURE 4 represents the output voltage versus frequency characteristic of the network. It will be observed when the network is properly aligned the reactance of the two series crystals 11 and 12 has the same value as that of the inductor 10 at the center of the operating band. Also, the frequencies $f_b$ and $f_d$ are adjusted to fall above and below the center frequency $f_m$ by substantially the same amount so that the output voltage characteristic is substantially symmetrical about the mean frequency $f_m$. Since only a portion of the frequency range between the critical frequencies $f_b$ and $f_d$ is used in most applications, the maximum bandwidth that the applied signal has, is roughly defined by the shaded area 30 in the central region between the frequencies $f_b$ and $f_d$. This maximum bandwidth is usually limited to approximately 50% of the spacing between $f_b$ and $f_d$.

Figure 5:
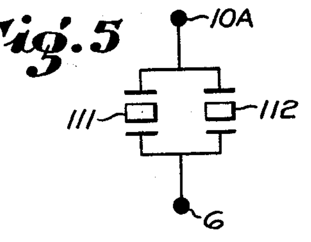
FIGURE 5 illustrates a modified arrangement also embodying features of the present invention.

Following the present teachings which teach the use of two crystals, the two crystals may be connected not only serially as previously described but also by connecting two crystals of different resonant frequencies in parallel. This is indicated in FIGURES 5. In such parallel connection of the two crystals 110 and 111 their joint action is to produce generally the same characteristic as that illustrated in line 22 of FIGURE 3, except that in this case the zeros of the parallel combination are essentially the same as that for the individual crystals and one pole is located between the zero and the pole of the lower frequency crystal and one pole is located between the zero and the pole of the higher frequency crystal.

In a typical circuit embodying the present invention, the piezoelectric crystals 11 and 12 in FIGURE 1 may have a nominal resonant frequency of 10.05 and 9.95 megacycles respectively. The center or mean frequency designated at $f_m$ in this particular example is then 10 megacycles. In all cases it is preferred that the impedance of the impedance element shown as an inductance 10 in FIGURE 1, has a value which is substantially equal to the value of the impedance of the series-connected crystals 11 and 12, i.e. at the mean frequency the impedance of the inductance 10 is substantially equal to the impedance of the series-connected crystals so that operation may be achieved about a zero reference level as indicated in FIGURE 4.

The operation of the circuit in FIGURE 1 may be briefly described as follows. During the positive half cycle of the signal from source 9 the terminal 5 is of positive potential and the terminal 6 is of relatively negative potential and under this condition the condenser 14 is charged through a path which includes the diode 13, condenser 14 and diode 15 to produce a positive rectified voltage across condenser 14, such positive rectified voltage appearing also across the resistance 16 with the polarity indicated. It is noted that the diode 15 at that time effectively short-circuits the series-connected crystals 11 and 12 and also the resistor 17. During the next succeeding half cycle, i.e. when terminal 6 is rendered positive with respective to the terminal 5, the diodes 13 and 15 are, of course, non-conducting and capacitances of the series-connected crystals 11 and 12 as represented at $C_0$and $C_0'$ in FIGURE 2 (as well as the self-capacitance of the diode 15) are charged in the production of a voltage across resistance 17 indicated by the plus and minus signs. These voltages at the center or mean frequency $f_m$ developed across resistances 16 and 17 are equal and opposite so that the net voltage across terminals 23 and 6 is substantially equal to zero. For these purposes the time constant of the circuit comprising capacitor 14 and resistance 16 as well as the time constant of the circuit comprising resistance 17, the capacitances $C_0$, $C_0'$ and the self-capacitance of non-conducting diode 15 are each approximately 1/10 of a microsecond or less so that the voltages developed across the resistances 16 and 17 may follow changes in frequency. The series circuit provided by the resistance 18 and condenser 19 has a relatively long time constant for assuring a filtered D.C. voltage appearing across the output terminals 7 and 8.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A discriminator network for detecting a frequency modulated signal comprising:
   - a pair of input terminals adapted to have said signal applied thereto;
   - a voltage divider connected across said terminals and including a reactive element and piezoelectric structure connected in series with said reactive element, said structure comprising a pair piezoelectric crystals, one of said crystals having a resonant frequency and an antiresonant frequency higher than the resonant and antiresonant frequencies respectively of the other crystal, and means interconnecting the crystals to provide said structure with an impedance which varies between a relatively high value and a relatively low value over a frequency range determined by the joint action of the crystals; and means coupled with said divider for providing a direct output voltage representative of the difference in magnitude between the voltage developed by said signal across said reactive element and the voltage developed by said signal across said piezoelectric structure.

2. The invention of claim 1, wherein said reactive element has an impedance substantially equal to the impedance of said piezoelectric structure at the center frequency of said signal.

3. The invention of claim 2, wherein said structure has an impedance that decreases from said relatively high value at a frequency below the center frequency of said signal to said relatively low value at a frequency above said center frequency.

4. The invention of claim 2, wherein said structure has an impedance that decreases from said relatively high value at a frequency below the lower limit of the frequency band occupied by said signal to said relatively low value at a frequency above the upper limit of said band.

References Cited in the file of this patent

UNITED STATES PATENTS

| | | |
|---|---|---|
| 2,005,083 | Hansell | June 18, 1935 |
| 2,374,735 | Crosby | May 1, 1945 |
| 2,712,600 | Beckwith | July 5, 1955 |
| 2,755,376 | Fagot | July 17, 1956 |
| 2,913,580 | Kosowsky | Nov. 17, 1959 |